Figure 1:
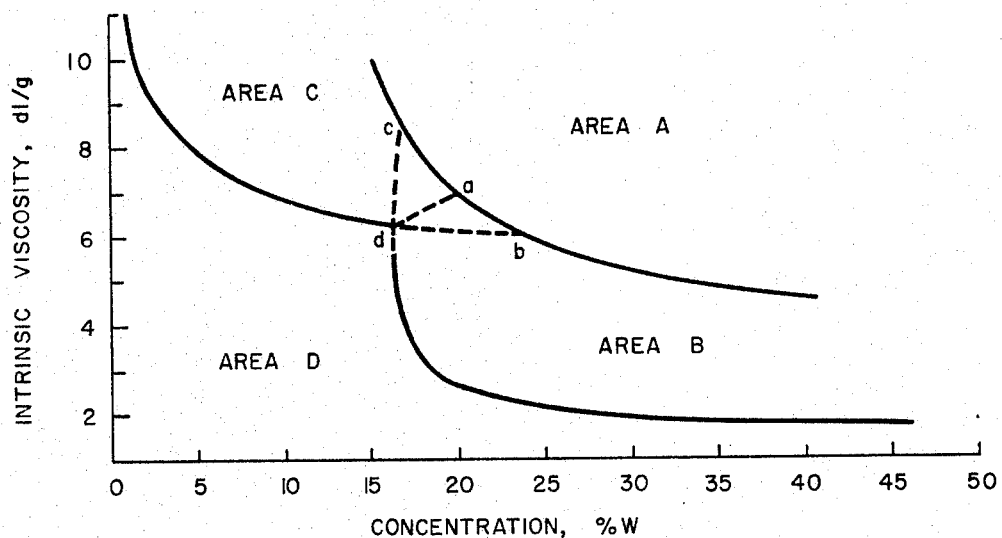

INVENTORS:
GEZA S. RONAY
WEBSTER M. SAWYER
BY: *Harold Shain*
THEIR ATTORNEY

United States Patent Office 3,285,869
Patented Nov. 15, 1966

3,285,869
EMULSIONS AND LATICES OF CIS 1,4-POLYISOPRENE
Geza S. Ronay, Oakland, and Webster M. Sawyer, Jr., Orinda, Calif., assignors to Shell Oil Company, New York, N.Y., a corporation of Delaware
Filed Mar. 5, 1962, Ser. No. 183,688
10 Claims. (Cl. 260—23.7)

This application is a continuation-in-part of copending application Serial No. 848,353, filed October 23, 1959, now abandoned.

This invention relates to novel emulsions of cis 1,4-polyisoprene. More particularly, it relates to stable emulsions of cis, 1,4-polyisoprene and the corresponding latices.

It is known that cis 1,4-polyisoprene may be produced by a variety of processes which comprise polymerizing isoprene with any of a variety of catalysts. The methods and processes which are directed to the polymerization of isoprene form no part of this invention, but reference may be had to the prior art for information on the methods for producing the cis 1,4-polyisoprene. Art which describes the preparation of the cis 1,4-polyisoprene is represented by French Patents 1,159,498 and 1,139,418 and U.S. Patent 2,856,391.

Cis 1,4-polyisoprene is a useful elastomer which is structurally similar to natural rubber of the Hevea variety. In this specification whenever reference is made to "cis 1,4-polyisoprene" it will be understood that reference is being made specifically to the synthetically produced cis 1,4-polyisoprene and this is to be distinguished from natural rubber which contains substantial amounts of non-rubber substances including proteins, carbohydrates, lipoids and some inorganic substances. Additionally, the natural rubber contains gel and is highly branched. On the other hand, cis 1,4-polyisoprene is produced in the presence of a hydrocarbon solvent by methods which may be referred to as "solution polymerizations" so that the elastomer forms and remains in solution during the course of the polymerization and is, therefore, free of gel. Additionally, it is free of branching and does not contain the naturally occurring non-rubber substances. These features of the polyisoprene solution are vital considerations to the present invention. The methods of recovering the cis 1,4-polyisoprene from hydrocarbon solutions may take one of several forms. In the prior art, it is reported that the solid elastomer is recovered from the hydrocarbon solutions by coagulation with a polar solvent, as a lower alcohol. Such procedures are perfectly suitable for small laboratory operations but are, as a practical matter, wholly unsuitable for commercial operations because of cost considerations. Another reported procedure for recovering the cis 1,4-polyisoprene from hydrocarbon solutions is by passing the elastomer solution through extruders whereby the hydrocarbon solvent is driven off and the solid crumb is recovered. This procedure may be more suitable than recovery by coagulation with a lower alcohol, but it has the disadvantage of also being very costly. Still another method for recovering the cis 1,4-polyisoprene is by coagulating the elastomer by feeding the solution into a vessel containing hot water whereby the solvent is flashed and the solid crumb floats to the top of the hot water vessel. Thereafter the crumb is recovered by any means such as by skimming. This latter procedure of recovering the elastomer is more preferred in that it is more economical and can be usefully adapted to mass production techniques. All of these procedures produce the cis 1,4-polyisoprene as a solid crumb. However, for a plurality of reasons it is desirable to provide emulsions of cis 1,4-polyisoprene. One of the reasons why emulsions of cis 1,4-polyisoprene would be particularly useful is that a substantial demand exists for latices prepared from such emulsions, which latices are particularly useful for the preparation of foam rubbers. The emulsions of cis 1,4-polyisoprene are also particularly desirable since they may be used to produce latices of cis 1,4-polyisoprene and thereby provide a still more economical means for recovering cis 1,4-polyisoprene as a solid. Another aspect of this invention then relates to the production of latices of cis 1,4-polyisoprene from the emulsions which are afforded by the present invention.

It is an object of this invention to provide stable emulsions of cis 1,4-polyisoprene. It is another object of this invention to provide latices of cis 1,4-polyisoprene and thereby provide novel recovery processes for cis 1,4-polyisoprene from hydrocarbon solutions thereof. Other objects will become apparent as the description of the invention proceeds.

Figure 2:
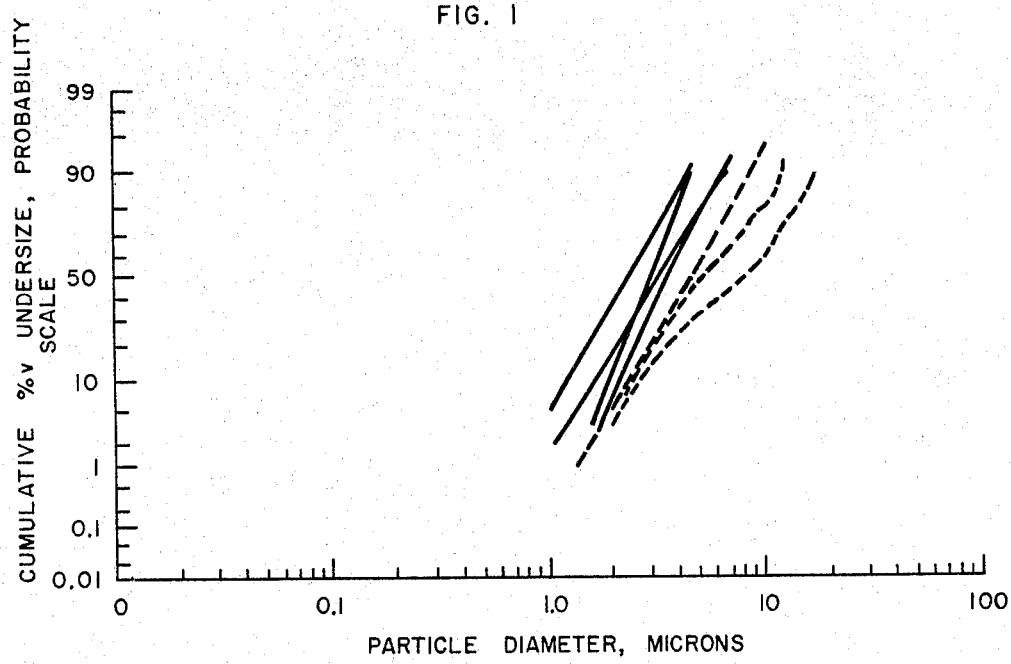

These and other objects are accomplished by emulsions which comprise as the essential ingredients cis 1,4-polyisoprene in an inert hydrocarbon solvent, an emulsifying agent, and water. The essential components are present in a definite relationship and the departure from the relationship, which will be set forth presently, may not yield suitable stable emulsions. The reasons why the various relationships are important will become fairly apparent to persons skilled in the art when the various components are considered together with the processes for producing the emulsions. Some of these relationships are shown in FIGURE 1 which will be considered in more detail hereinafter. FIGURE 2, which also is discussed later, relates to the diameters of the particles in the emulsions (dotted lines) and latices (solid lines).

Although the methods for producing the cis 1,4-polyisoprene form no part of this invention, it will be useful to a better understanding of this invention to make some comments concerning the more important features of cis 1,4-polyisoprene and the processes for producing it. Such features as the proportion of the cis 1,4-content, the intrinsic viscosity (I.V.), the concentration of the cis 1,4-polyisoprene in the hydrocarbon solvent, the molecular weight distribution, the nature of the hydrocarbon solvent, nature of the catalyst, purity of the polymerization system, and the like are important. The importance of these and other factors may be reflected in the recovery processes mentioned above and those of the present invention. Some of the features are more important in the present invention whereas others are of no significance. Thus, for example, as it relates to the present invention, the nature of the catalysts employed in the preparation of the cis 1,4-polyisoprene, the hydrocarbon solvent, and similar considerations that are directed to the polymerization processes form no controlling part of the present invention. On the other hand, concentration of the cis 1,4-polyisoprene in the hydrocarbon solvent is important and the important features are discussed here in detail, but it will be useful to consider first the processes whereby the emulsion of the cis 1,4 - polyisoprene are prepared.

The preparation of the emulsions require that the cis 1,4-polyisoprene solution, emulsifier, and water be brought together and then homogenized with any conventional type of homogenizer or colloid mill. In this description an Eppenbach homomixer is employed unless otherwise specified. The mixing schedules range from about ½ to 10 minutes, depending mainly on such factors as the volume of material within the homogenizer, the concentration of the cis 1,4-polyisoprene in the hydrocarbon solvent, the nature of the emulsifier, the efficiency of the homogenizer, and similar variables. In general, it is more beneficial to carry out the homogenizing steps initially at low speeds, and then later go into higher speeds for a period of 2 to 3 minutes or longer. Alternatively, the emulsions may be prepared by charging the ingredients into the homogenizer but withholding a portion of the emulsifying agent. The balance may then be added after the homognization has begun. By this procedure, sufficient emulsifying agent is withheld so that initially a water-in-oil emulsion is formed with the oil (elastomer solution in this case) being in the continuous phase. Upon the addition of the balance, inversion takes place and an oil-in-water emulsion is formed. It is essential to this invention that the final emulsion be oil-in-water if the emulsions are to be stable and this is a vital and important aspect of this invention.

When referring to the emulsions and latices, it is sometimes useful to refer to the diameters of the particles of dispersed elastomer solution. The diameters of the particles are determined by any convenient means with due regard being given to the statistical procedures. It is for this reason that the characteristic diameters for a given emulsion are always expressed in terms of averages. Furthermore, it will be appreciated that the several averages can be varied a good deal within the specified averages without adversely affecting the stability of the emulsions. More detail on the procedures used here appears hereinafter. In order that the emulsions of cis 1,4-polyisoprene be stable, the following ranges of averages are suitable:

Number average ($D_n$) _____ 0.5–3.0µ
Surface area ($D_s$) _____ 0.5–4.0µ
Volume average ($D_v$) _____ 0.5–5.0µ
Surface: volume ratio ($D_{sv}$) _____ 0.5–10.0µ
Volume median diameter ($D_{mv}$) _____ 0.5–10.0µ

If the emulsion particles have the specified diameters then the emulsions will be stable irrespective of the characteristics of the elastomer solution. This does not mean that the elastomer solution is not important because not all solutions of cis 1,4-polyisoprene can be easily formed into stable emulsions. Thus the characteristics of the elastomer solution are more important to the processes for producing the emulsions and latices rather than to the characterization of these compositions. In order that the various aspects of the invention may be fully understood, mention will be made of physical characteristics of the elastomer solution although it will be understood that the preparative methods for such solutions form no part of this invention.

Based on extensive experiments it has been found that the molecular weight, represented by the intrinsic viscosity (I.V.), is not a limiting factor in the production of stable emulsions and in actual practice the cis 1,4-polyisoprene may have any molecular weight. Thus, if desired, the intrinsic viscosity of the cis 1,4-polyisoprene may be as high as 13.0 or higher without affecting the stability of the emulsions of their emulsifiability. As a practical matter, however, cis 1,4-polyisoprene having such a high I.V. presents practical difficulties when the final elastomer is compounded. Accordingly, it is preferred that the cis 1,4-polyisoprene having an I.V. range from 1.0 to about 8.0 with I.V.'s in the order of about 2.0 to 6.0 being more preferred. Whenever reference is made to intrinsic viscosity or I.V., it will be understood that the determinations are made in toluene at 25° C.

The intrinsic viscosity, however, should not be considered apart from the concentration of the elastomer in the hydrocarbon solvent and if the concentration exceeds about 25% by weight, the solution is not as readily emulsified. Even at 20–25% by weight, the emulsions obtained are less suitable because they are quite coarse. It is for these reasons that it is much preferred to employ elastomer solutions having a lesser solids content. In a more preferred embodiment a solids content of between 5–15% by weight of cis 1,4-polyisoprene is best although the concentration may be as low as 1% by weight. It will be readily apparent that it is wasteful and uneconomical to operate at the lower concentrations and, accordingly, the most preferred range of 10–15% by weight represents a region of economical and efficient operations while assuring that good stable emulsions will be obtained consistently. Furthermore, at such concentrations the I.V. may have any value. These relationships are graphically shown in FIGURE 1.

FIGURE 1 shows various plots of I.V. vs. the concentration of the elastomer solution. The areas delineated by the curves represent the results of the interrelated effects of I.V. and concentration on emulsifiability and a diagram represented by FIGURE 1 hereinafter is referred to as the "emulsifiability diagram" of cis 1,4-polyisoprene. Area A represents elastomer solution that cannot be emulsified because the effects of high viscosity and high concentration have combined to defeat emulsification. By way of illustration, an elastomer solution that has a concentration of 25% by weight and an I.V. of 9.0 falls within Area A and cannot be emulsified.

Area B represents the conditions that will result in an unstrippable slimy foam when emulsification is attempted. This foam is a less desired product. It will be obtained if in the above example the elastomer has an I.V., for example, of 4.0.

With conditions of Area C, water-in-oil emulsions will be obtained on emulsification and in Area D the oil-in-water emulsions are obtained. Area D represents the most preferred conditions although the conditions in Area C are also suitable provided inversion is accomplished by the addition of more soap. The dotted lines are extrapolations where clear delineations within one of the four areas are difficult to establish and it is usually unnecessary to operate within the bounds of lines $bcd$. However, if a choice must be made, then the line $ad$ should be selected as the boundary line. In considering the lines in FIGURE 1, it will be fairly evident that the lines are not precise because of the difficulties in determining precisely the several variables that are involved. A surprising feature of this invention, wholly undescribed in the prior art and unexpected in emulsion technology, is the finding that emulsifiability diagrams of the type shown in FIGURE 1 exist for the emulsification of cis 1,4-polyisoprene solutions. If one modifies the preparation methods the lines on the emulsifiability diagram will be shifted to the right or left depending on the modification adapted. For example, if one increases the power input during the emulsification, the lines will shift to the right. In any case the area of stable oil-in-water emulsion will always be in the lower left hand portion of the diagram and the area of water-in-oil emulsions, which are easily inverted to oil-in-water emulsions, will fall in the upper left hand portion of the emulsifiability diagram. The general location of the lines in FIGURE 1 are reasonably definite and certainly are sufficiently definite to show persons skilled in the art those conditions that may be employed and those conditions that should not be employed.

Continuing with the discussion of the various properties of the elastomer solution, it is found that the viscosity of the solution may be as high as about 800,000 centipoises. At such viscosities difficult material handling problems will arise and it is judicious to maintain the viscosity in the order of 150,000 centipoises or less.

It is found that the cis 1,4-content of the elastomer does not play any role in the preparation of the stable emulsions of the present invention. In actual practice and from the point of view of utility of the ultimate product, it is preferred that the cis 1,4-content be in the order of about 85% or higher and more preferably in the order of 90–95% or higher. On the other hand, one may also emulsify the polyisoprene irrespective of its cis content, but since the cis content is so intimately related to the utility it is not likely that one would desire to emulsify synthetic polyisoprene having less than about 60% of the cis 1,4-addition product.

The hydrocarbon solvent for the cis 1,4-polyisoprene likewise is not a critical or limiting factor. In actual practice, however, the solvent, or diluent, for the cis 1,4-polyisoprene will be a normally liquid inert aliphatic hydrocarbon solvent because such a solvent is most usefully employed during the preparation of the cis 1,4-polyisoprene. In essence, such a solvent is employed because of its lower boiling point in comparison to, say, aromatic or cycloaliphatic solvents and this has very material advantages and benefits in the production of the cis 1,4-polyisoprene. Furthermore, since the emulsions are essentially converted to latices by the separation of the hydrocarbon solvent, usually by evaporation, the lower boiling point aliphatic solvents are much preferred as a practical matter. Particularly preferred are the aliphatic solvents having from 5 to 8 carbon atoms or various mixtures thereof. Thus, for example, gasoline may also be employed as a solvent although it would not necessarily be used because of its higher cost. Amylene also is suitable as, surprisingly, it is inert during the polymerization when lithium based catalysts are employed.

The emulsifying agent employed in the present invention likewise is not critical but some are more preferred than others. Most preferred are the potassium or sodium soaps of fatty acids with the former being particularly preferred. Among the suitable soaps there may be mentioned the potassium, or sodium, salts of rosin acids, oleic acid, palmitic and stearic acid, lauric acid, myristic acid, arachidic acid, castor acids, and other soaps. Of the numerous soaps examined, a particular preference is expressed for the potassium soaps of rosin acids because these soaps are found to cause less foaming. Other soaps are suitable also although the foaming may be more pronounced. If too severe a foaming problem exists, antifoaming agents may be used. The use of antifoaming agents, while greatly facilitating the preparation of latices and permitting a wider choice of soaps, have the disadvantage that the resulting latices may not be suitable for the preparation of foam rubbers. This depends, however, largely on the particular processes that might be employed in the preparation of such foams. Because of the foaming considerations, it will be apparent that it may be advantageous to employ the soap in an amount as low as the system will reasonably permit and in this regard it appears that emulsification may be suitably obtained with as little as about 0.25% by weight of soap based on the weight of elastomer. Any amount in excess of that required to produce emulsification may be employed but amounts in excess of 10% by weight will not normally be required. With the more preferred soaps, i.e., the rosin acid soaps, amounts preferably range from about 1.0 to about 10.0% by weight of the elastomer.

The other class of suitable emulsifying agents are surface-active agents, or "surfactants," and it makes little difference whether they are ionic or nonionic providing they are water soluble. Among the cationic surface-active agents there may be mentioned the amine salts such as hydroxyamines of long chain fatty acid esters, quaternary ammonium salts as tridecylbenzyl hydroxy ethyl imidazolinium chloride and stearyl dimethylbenzyl ammonium chloride, and the like. Nonionic sufactants are represented by the phosphoric esters of higher alcohols such as capryl and octalcohol, monoesters of oleic acid and pentaerythritol, sorbitan monooleate and the like. Anionic surface-active agents are represented, for example, by the most preferred embodiments of this invention, i.e., potassium and sodium salts of long chain fatty acids. Since the preferred procedures of this invention offers substantial advantages from the technological point of view, this description is mainly confined, in so far as the emulsifying agent is concerned, to the more preferred embodiments but it will be understood that other emulsifying agents may be employed.

Before presenting various data to illustrate this invention, it is desirable to describe in detail the procedures employed for the preparation of the emulsions described in the data. Briefly, emulsification experiments are performed in an open cylindrical vessel of 4⅝ by 9 inches. To the vessel is added first 200 milliliters of aqueous phase and then approximately 400 milliliters of elastomer solution is added. With these amounts the jar was about one-quarter full. An Eppenbach Homomixer is lowered into the jar within about ¼ inch of the bottom. The mixing schedule is begun with a period of ½ to 2 minutes at a slow speed, corresponding to 30–40 volts on a Variac speed controller, and then followed by a 2 to 3 minute period at full speed. In other instances the times are longer. In making water-in-oil emulsions with very viscous elastomer solution it is found to be advantageous to raise the mixer until the bottom intakes are just within the elastomer solution rather than in the aqueous phase. With water-in-oil emulsions the periods of relatively slow mixing are less successful and erratic. In many instances, the time of about 3 minutes is adequate to produce emulsions which do not change appreciably in particle size with further mixing, and this is particularly true with the emulsions which form directly in the field elastomer solutions. On the other hand, for the oil-in-water emulsions which form after inversion, there is some decrease in the particle size on continued mixing. In general, the temperatures of the mixing during the emulsification process is not important, and as the emulsification continues there will be a temperature rise which has no significant effect either on the emulsification or on the properties of the final product. In general, the volumetric phase ratio of elastomer solution to water is held constant at about 2:1 although it may range from about 3:1 to about 1:10 or higher.

Table I illustrates the effect of various soaps on the emulsification of cis 1,4-polyisoprene in hexane. The cis content of the polyisoprene is 92.5%; the rosin acid soap, "Dresinate 214," is a product of Hercules Powder Company; "KOL," is potassium oleate added as oleic acid to the elastomer solution; NaFA is sodium fatty acids; the soap solution/rubber solution ratio is a volumetric phase ratio of about 2.0. The characteristics of the emulsion are an arbitrary standard based on visual observation and are based on particle size as shown by photomicrographs, the appearance of the emulsion after high dilution for microscopic observations, and the amount of foam produced on emulsification. Some aspects of the formation of the latices are also shown although the discussion of the preparation of latices appears later.

TABLE I

| Experiment | 29 | 30 | 33 | 34 | 35 | 37 | 38 | 27 |
|---|---|---|---|---|---|---|---|---|
| Elastomer Conc., percent w | 12.4 | 12.4 | 12.4 | 14.9 | 14.9 | 11.9 | 12.3 | 12.4 |
| Soap Conc., percent w.: | | | | | | | | |
| Dresinate 214 | ½ | ¼ | ¼ | | ¼ | ½ | ¾ | 1 |
| KOL | ½ | ¾ | ½ | | ¼ | ½ | ¼ | |
| NaFA | | | | ¼ | ¼ | | | |
| Soap/Rubber, g./100 g | 6.8 | 5.8 | 4.1 | 3.1 | 2.9 | 3.9 | 4.2 | 5.6 |
| Phase Ratio [1] | 1.18 | 1.38 | 1.48 | 1.64 | 1.75 | 1.60 | 1.45 | 1.45 |
| Characteristics of Emulsion | E | E | E | F | F | G | E | E |
| Foam on Stripping | | High | High | | | High | Med | Med |
| Solids in Latex, percent w | | 14.0 | 15.1 | | | 15.9 | 15.2 | 15.0 |
| Coagulum, percent w. of rubber | | 4.2 | 0.3 | | | 1.3 | 2.5 | 1.8 |
| Polymer IV, dl./g | 7 | 7 | 7 | 6.2 | 6.2 | 62. | 6.2 | 7 |

[1] Weight polymer solution/weight soap solution; approximately a volumetric phase ratio of 2.
E=Excellent; G=Good; F=Fair.

In general, the presence of macroscopic droplets of rubber solution in the emulsions, i.e., droplets in the order of about 25 or more microns, are considerably less desired and are taken as a criterion of a less satisfactory emulsion, and in the above table only the better emulsions were stripped to prepare latices.

Table II illustrates the effect of elastomer concentration of the emulsification of the polyisoprene solution in hexane. The soap is "Dresinate 214."

TABLE II

| Experiment | 44 | 38 | 42 | 75 | 80 | 40 | 49 | 39 |
|---|---|---|---|---|---|---|---|---|
| Elastomer IV | 6.2 | 6.2 | 2.3 | 2.3 | 2.3 | 2.3 | 2.3 | 2.3 |
| Elastomer Solution: | | | | | | | | |
| Viscosity, poises | 4 | 2.0 | 3 | 4 | 53 | 135 | 135 | 476 |
| Conc., percent w | 5.7 | 12.3 | 11.5 | 12.0 | 21.7 | 26.7 | 26.9 | 32.2 |
| Soap Solution Conc., percent w | ¾ | ¾ | ¾ | ¾ | ¾ | ¾ | ¾ | ¾ |
| Wt. Phase Ratio, o/w | 1.52 | 1.45 | 1.35 | 1.41 | 1.37 | 1.28 | 1.47 | 1.50 |
| Initial Emulsion | o/w | o/w | o/w | o/w | [1] o/w | Mixed | Mixed | Mixed |
| Initial Foaming [2] | 1.5 | 2 | 2 | 1.5 | 2 | 3 | 3 | 3 |

[1] Emulsion was coarse.
[2] Estimated final foam volume/initial volume.

From experiments 40, 49 and 39 it will be seen that no emulsion formed under the conditions employed because of the combined effects of I.V. and concentration. This will be seen by referring to the emulsifiability diagram. In experiment 80, however, the concentration was about 20%, by weight, and, therefore, emulsification took place.

The viscosity and concentration of a solution of cis 1,4-polyisoprene may be independently varied over a wide range by use of polymers of proper molecular weight. This is shown by a series of experiments covering a wide range of viscosities which experiments show that the viscosity determines the type of emulsion initially produced. Although it is difficult to attempt to clearly separate the effect of polymer concentration, the results suggest that increasing viscosity affects a gradual transition in emulsion type from water-continuous o/w systems, through mixed emulsions containing regions of o/w and w/o emulsions (or in some cases no emulsions at all), to emulsions which are definitely oil continuous, i.e., w/o. The amount of foam produced during emulsification also varies during this transition and it is seemingly greatest in the mixed emulsion region, at least for the oil-continuous systems even after subsequent inversion by the addition of more soap. Some typical experiments are contained in Table III.

from the emulsion and this may be accomplished by any of a number of techniques. The greatest difficulty encountered is the removal of the solvent is the problem of foaming and it is found that the solvent is suitably stripping from the emulsions by the use of flashing apparatus in the form of a flask, or a similar piece of apparatus, attached to a vertical column with a side arm at the top leading to a condenser; the column serves to contain foam. Desirably the container holding the emulsion, and the top and bottom portions of the column are heated. If desired, heated nitrogen at temperatures in the order of 40–80° C. may be bubbled into the emulsion through a sintered disc. Steam may be used in place of the nitrogen and is generally equally suitable. The stripping operation is suitably conducted at temperatures within the vessel containing the emulsion in the order of 25–70° C.; the column temperature may range from 30–50° C. at pressures ranging from atmospheric to about 16 inches of Hg vacuum.

The influence of soap concentration in the emulsion of concentrated elastomer solutions is more quantitively manifest in the amount of coagulum formed during the stripping step that in the behavior during emulsification and it may be said that it is because of the stripping that careful attention should be given to the influence of the soap. Table IV indicates that although emulsions containing about 21.7% solids appear comparable when made with about ⅜ or ¾ or even 1½% by weight of the rosin acid soap "Dresinate 214," the amount of coagulum produced is higher than desirable. Nevertheless, the increasing amount of soap serves to reduce the coagulum as is seen from experiments 63 and 86. In contrast an emulsion made from elastomer solutions containing a lesser percentage of solids, that is in the order of 12% by weight, and using the same amount of soap, which

TABLE III

| Experiment | 44 | 38 | 54 | 52 | 39 | 59 | 60 | 67 | 64 |
|---|---|---|---|---|---|---|---|---|---|
| Elastomer IV | 6.2 | 6.2 | 6.2 | 3.2 | 2.3 | 7.7 | 7.7 | 7 | 7 |
| Elastomer Solution: | | | | | | | | | |
| Viscosity, poises | 4 | 210 | 292 | 500 | 476 | 880 | 880 | 1,570 | 5,000 |
| Conc., percent w | 5.7 | 12.3 | 14.0 | 22.6 | 32.2 | 10.7 | 10.7 | 11.9 | 15 |
| Soap Solution Conc.,[1] percent w | ¾ | ¾ | ¾ | ¾ | ¾ | ¾ | ⅜ | ⅜ | ⅜ |
| Phase Ratio, g./g | 1.52 | 1.45 | 1.21 | 1.02 | 1.50 | 1.33 | 1.43 | 1.39 | 1.44 |
| Initial Emulsion Type | o/w | o/w | o/w | Mixed | Mixed | w/o | w/o | w/o | w/o |
| Foam During the Emulsification [2] | 1.5 | 2 | 2 | 3+ | 3+ | 1+ | 1+ | 1+ | 1+ |

[1] Original concentration in aqueous phase. Soap required for inversion not included.
[2] Volume of emulsion plus foam/initial volume.

The main use of the emulsion is as an intermediate for the production of latices of the elastomer. Essentially, the latices are obtained when the solvent is removed amount may be based either on the rubber or on the aqueous phase, results in substantially less coagulum on stripping as is seen from experiment 75.

TABLE IV

| Experiment | 63 | 80 | 86 | 75 |
|---|---|---|---|---|
| Elastomer Solution Conc, percent w | 21.7 | 21.7 | 21.7 | 12 |
| Elastomer Solution vis, poises | 53 | 53 | 53 | 4 |
| Emulsion Properties: | | | | |
| Foaming [1] | | 2 | 3 | |
| Solids, percent w | 12.6 | 12.4 | 12.8 | 7.5 |
| Phase Ratio, w./w | 1.47 | 1.37 | 1.40 | 1.41 |
| Total Soap, percent w | ¾ | ¾ | 1.5 | ¾ |
| Latex Properties: | | | | |
| Solids, percent w | 12.5 | 17.7 | 18.3 | 15.8 |
| Soap, g./100 solids | 1.2 | 2.5 | 5.0 | 4.5 |
| Coagulum, g./100 g. rubber | ca. 50 | 19 | 11.5 | 1.4 |

[1] During emulsification: Emulsion+foam/initial volume.

Additional representative experiments are presented in Table V and it is noteworthy that less coagulum is obtained from emulsions made by the inversion procedure rather than from those made from the direct procedures. Thus, the emulsion of experiment 74 differs from the others in that a smooth, mayonnaise-like water-in-oil emulsion was made with "Aerosol TR" and inverted with "Dresinate 214." "Aerosol TR" is sodium bis(tridecyl) sulfosuccinate. Although the coagulum formed in that case is low it does not appear to be significantly lower than that formed in a comparable inversion using "Dresinate 214" alone as is shown in experiment 68.

ous phase were permitted to stand overnight. Clear serums were obtained in both cases with as much as 45% solids in the first case and as much as 50% solids in the second case being obtained. The cream is readily dispersible in water and practically no rubber is found in the serum; quantative assessment of photomicrographs of the redispersed phase indicates that no increase in particle size occurs. An alginate concentration of 0.05% seems to be a minimum when the soap is a rosin acid soap such as "Dresinate 214." With other soaps amounts of alginate in the order of 0.1% by weight may be suitable and amounts in excess of 0.5% represent a practical upper limit.

In addition to the concentration of latices by the addition of a creaming agent as ammonium alginate, latices may be concentrated by centrifuging and, as a representative illustration, a latex containing 14.7% solids was concentrated to 67% by weight solids with 8% of the total polymer in the serum phase in 10 minutes at 3400 gravity (5000 r.p.m.). The concentrated emulsion was readily redispersed in water with no significant coagulation. This experiment indicates that the recycling of the serum from such a separation through the emulsification step may be employed to recover and reuse the soap left in the serum and thereby reduce very substantially the overall consumption of soap.

A method of preparing a latex of intermediate solids

TABLE V

| Experiment | 38 | 41 | 60 | 67 | 68 | 74 | 80 |
|---|---|---|---|---|---|---|---|
| Elastomer IV | 6.2 | 6.2 | 7.7 | 7 | 7 | 7 | 2.3 |
| Elastomer Soln Conc, percent w | 12.3 | 12.3 | 10.7 | 11.9 | 11.9 | 11.9 | 21.7 |
| Elastomer Soln vis, poises | 210 | 210 | 880 | 1,590 | 1,300 | 1,300 | 53 |
| Emulsion Properties: | | | | | | | |
| Volatiles, percent w | 53 | 48 | | | | | |
| Solids, percent w | 7.3 | 7.1 | | | 6.6 | | 12.4 |
| Foaming [1] | 2 | 2 | 1.5 | 1.3 | 2 | 2 | 2 |
| Phase Ratio, w./w | 1.45 | 1.40 | 1.43 | 1.31 | 1.39 | 1.27 | 1.37 |
| Method [2] | D | D | I | I | I | [3] I | D |
| Total Soap, percent w.[4] | ¾ | ¾ | ⅜+⅜ | ⅜+⅜ | ⅜+⅜ | ⅜+⅜ | ¾ |
| Latex Properties: | | | | | | | |
| Volatile, percent w | 0.2 | 0.1 | | | 3.4 | | |
| Solids, percent w | 15.2 | 14.5 | 13.2 | 13.6 | 12.9 | 13.9 | 17.7 |
| Soap, g./100 g. solids | 4.2 | 4.5 | 4.9 | 4.7 | 4.5 | 5.0 | 2.5 |
| $D_{sv}$, microns | 2.8 | | | 2.2 | | | |
| Coagulum, g./100 g. rubber | 2.5 | 2.7 | 0.8 | 1.4 | 0.8 | 0.4 | 19 |

[1] Volume of Emulsion+Foam/Initial Volume.
[2] D=Direct; I=Inversion.
[3] w/o made with Aerosol TR ⅜% and inverted with Dresinate 214 ⅜%.
[4] The first number refers to the soap concentration used to obtain the w/o emulsion. The second number refers to the soap added to cause the inversion.

The latices of this invention may form a cream-like layer on standing for several days. After standing for several weeks as much as 50%, by volume, of clear serum may separate but the cream-layer is readily and completely dispersible in its serum by gentle mixing except for any skin which may form at the air interface if drying is permitted to occur during storage. Such latices are considered stable. A further characteristic of the stable emulsions and latices is that after remixing the particle size is quantatively unchanged even after the latex has been stored for two months. Latices are considered unstable, on the other hand, when separation occurs after standing for several minutes or hours, or when the particle size changes after standing for short periods of time. Rosin acid soaps are quite effective as stabilizers against particle coalescene but they seemingly do not prevent creaming, a tendency which is more pronounced for latices of relatively large particle size. The creaming characteristics of the latices may be used to advantage for the preparation of latices of high solids content and the rate of creaming may be accelerated by the addition of creaming agents as ammonium alginate. By way of illustration latices of 5 and 15% solids, respectively, and 0.1% by weight of ammonium alginate based on the aqueous content is afforded by adding fresh elastomer solution to finished latex. Since the removal of hydrocarbon solid from an emulsion by stripping always involves a loss in interfacial area, desorption of soap takes place. This increase in the amount of soap in the aqueous phase of the latex is accordingly available for emulsification of more elastomer solution. As an illustration, an emulsion was made with 0.67% rosin acid soap solution and 0.5% potassium oleate. Upon stripping considerable foaming was encountered and 2.4% coagulum separated. To the latex, which contained 12.6% total solids, was added a 12.3% polyisoprene solution (203 grams) which was emulsified with 250 grams of the above finished latex and no additional soap. Although a small amount of rubber solution remained unemulsified, the separated emulsion was stripped and appreciably less foaming was encountered than with the original latex. In this case the final solids content of the latex was 17.7%.

In discussing the particle sizes of the latices, the same statistical considerations mentioned in relation to the particle sizes in the emulsions apply. Thus, it is useful to specify which average particle diameters are meant when referring to "average sizes" of different samples as was done previously with reference to the emulsions. The following ranges of average particle diameters determined by the procedures described hereinafter characterize the novel latices.

| | |
|---|---|
| $D_n$ | 0.2–2.5$\mu$ |
| $D_s$ | 0.3–3.0$\mu$ |
| $D_v$ | 0.3–3.5$\mu$ |
| $D_{sv}$ | 0.3–4.0$\mu$ |
| $D_{mv}$ | 0.3–5.0$\mu$ |

For additional guidance in the statistical procedures employed in the present invention, the following average diameter values are set forth in order to provide a basis of comparison:

$$D_n = \Sigma n_i d_i / N$$
$$D_s^2 = \Sigma n_i d_i^2 / N$$
$$D_v^3 = \Sigma n_i D_i^3 / N$$
$$D_{sv} = \Sigma n_i d_i^3 / \Sigma n_i d_i^2$$

and $D_{mv}$ = volume median diameter

For further information, see the book entitled "Small Particle Statistics," by G. Herdan, Elsevier Publishing Company, New York (1953).

Particle diameters, in microns, of the latices and emulsions of the cis 1,4-polyisoprene determined by the methods to be described are indicated in FIGURE 2, although stable latices will be obtained when the $D_v$ ranges from 0.1$\mu$ to 5.0$\mu$ irrespective of the methods employed for determining distribution of particles. Because the emulsions contain appreciable volumes of solvent, which solvent is removed to make the latices, the particle sizes of the emulsions will be somewhat larger and may range from about 0.2 to 10$\mu$. The plots on FIGURE 2 were determined based on actual count and because the emulsions and latices described here have been characterized by certain methods of analysis, it will be useful to describe the methods employed in determining particle sizes. The emulsions and latices of this invention may be suitable examined microscopically and recorded through microphotographs. The emulsions and latices, in general, are too concentrated to be observed directly under a microscope and accordingly it will be found to be more suitable to uniformly dilute all specimens 100-fold with distilled water. A commercial hamacytometer is very convenient to produce uniformly thin, covered layers of the diluted samples for direct observation or photomicrography. A 43-power objective and 10-power eye piece was found to be most practical. Photomicrographs were taken with a 3¾" x 4¼" Polaroid camera using PolaPan 400 film. With an Orthophot microscope substage illumination the best exposures were between ⅟₃₀₀ to ⅟₁₂₅ second. The overall photographic magnification was 235. The particles in the photomicrographs are counted and measured using a pocket comparator. Very satisfactory results are obtained by counting all particles in randomly selected areas of about 0.25 square inch which amounts to about ⅟₇ of the total picture area. For the purposes of the present invention the counting was in four randomly selected areas and the measurements were placed in five sized categories, i.e., less than 2.16$\mu$, 2.16–4.32$\mu$, 4.32–5.40$\mu$, 5.40–5.95$\mu$, and 5.95$\mu$+. The particles in the last two categories were then remeasured exactly over the entire picture and the two sets of data were combined on an area basis. This method of checking and cross-checking indicated that the method is accurate to within a few percent. In no case was the actual number of counted particles less than 237. After picture area-averaging, the distributions are based on 1000 to 2600 particles. For the study of sizes, particles having diameters of one micron or less were not counted because of viewing difficulties. It will be appreciated that the methods employed in determining particle size are capable of a great deal of variation which variation should not produce results materially different from those described here. Thus, if turbidimetric methods are used on the same specimens the numbers will be lower.

From the foregoing description of the invention, it will be appreciated further that the processes for producing the elastomers and emulsions may be varied considerably in various details and processing techniques which techniques and details will not materially affect the capability of the elastomers solution to be emulsified and the novel emulsions to be stripped to produce novel latices. Such variations, however, may be undertaken, as will be understood by persons skilled in the art, without departing from the spirit of the invention.

We claim as our invention:

1. Compositions comprising oil-in-water emulsions of synthetic, substantially gel-free cis 1,4-polyisoprene, an inert hydrocarbon solvent, an emulsifying agent, and water, the said polyisoprene being wholly soluble in the said hydrocarbon and having an intrinsic viscosity ranging from 1.0 to 13.0 measured in toluene at 25° C., and being present in an amount between 5% and 15% by weight of the inert hydrocarbon solvent having up to eight carbon atoms, the emulsifying agent being present in an amount in excess of 0.25% by weight, based on the weight of the polyisoprene, the said emulsion being stable and having a volumetric phase ratio of the polyisoprene solution to water ranging from 3:1 to 1:10 and the liquid particles of the emulsion having the following characteristics:

| | Microns |
|---|---|
| Number average | 0.5 to 3.0 |
| Surface area | 0.5 to 4.0 |
| Volume average | 0.5 to 5.0 |
| Surface to volume ratio | 0.5 to 10.0 |
| Volume median diameter | 0.5 to 10.0 |

2. The composition of claim 1 in which the solvent is an aliphatic hydrocarbon solvent.
3. The composition of claim 1 in which the emulsifying agent is an alkali metal salt of a rosin acid.
4. The composition of claim 1 in which the emulsifying agent is an alkali metal salt of oleic acid.
5. Synthetic latices prepared according to the process of claim 8 comprising synthetic, substantially gel-free cis 1,4-polyisoprene, an emulsifying agent and water, the polyisoprene being wholly soluble in an inert hydrocarbon solvent having up to eight carbon atoms and having an intrinsic viscosity ranging from 1.0 to 13.0 measured in toluene at 25° C., the emulsifying agent being present in an amount in excess of 0.25% by weight, based on the weight of the polyisoprene, the latex being free of hydrocarbon solvent and being stable on standing, the solid particles of the latex having the following characteristics:

| | Microns |
|---|---|
| Number average | 0.2 to 2.5 |
| Surface area | 0.3 to 3.0 |
| Volume average | 0.3 to 3.5 |
| Surface to volume ratio | 0.3 to 4.0 |
| Volume median diameter | 0.3 to 5.0 |

6. The latices of claim 5 in which the emulsifying agent is the alkali metal salt of rosin acid.
7. The latices of claim 6 in which the alkali metal is potassium.
8. The process comprising homogenizing a mixture of an emulsifying agent, water and a hydrocarbon solution of synthetic, substantially gel-free cis-1,4-polyisoprene, the emulsifying agent being present in an amount in excess of 0.25% by weight of the polyisoprene, the intrinsic viscosity of the polyisoprene (measured in toluene at 25° C.) being 1–13 and the concentration of the polyisoprene solution being 1–15% by weight, both as shown and within areas C and D on the annexed FIGURE 1, the polyisoprene being free of gel and free of branching, the amount of emulsifying agent and the degree of homogenizing being sufficient together to produce a stable emulsion of colloidally dispersed particles of polyisoprene solution in water and thereafter removing the hydrocarbon solvent forming the said solution by applying heat to the resulting stable emulsion.

9. The process of claim 8 wherein the emulsifying agent is an alkali metal salt of rosin acid.

10. The process of claim 8 wherein the emulsifying agent is an alkali metal salt of oleic acid.

References Cited by the Examiner

UNITED STATES PATENTS

| | | | |
|---|---|---|---|
| 2,849,432 | 8/1958 | Kibler et al. | 260—29.7 |
| 2,953,556 | 9/1960 | Wolfe et al. | 260—29.7 |
| 3,046,244 | 7/1962 | Hunter et al. | 260—29.7 |

FOREIGN PATENTS 847,525  9/1960  Great Britain.

OTHER REFERENCES

Marchionna: Butalastic Polymers (1946), Reinhold Publishing Corp., New York, N. Y. (pages 186–190).

MURRAY TILLMAN, *Primary Examiner.*

LEON J. BERCOVITZ, *Examiner.*

J. ZIEGLER, *Assistant Examiner.*

UNITED STATES PATENT OFFICE
CERTIFICATE OF CORRECTION

Patent No. 3,285,869                      November 15, 1966

Geza S. Ronay et al.

It is hereby certified that error appears in the above numbered patent requiring correction and that the said Letters Patent should read as corrected below.

Column 12, lines 25, 26 and 49, strike out "characteristics", each occurrence, and insert instead -- ranges of average diameters --.

Signed and sealed this 28th day of November 1967.

(SEAL)
Attest:

Edward M. Fletcher, Jr.                        EDWARD J. BRENNER
Attesting Officer                               Commissioner of Patents